US010725185B2

(12) United States Patent
Shetty et al.

(10) Patent No.: US 10,725,185 B2
(45) Date of Patent: Jul. 28, 2020

(54) SHARING OF A GLOBAL NAVIGATION SATELLITE SYSTEM ANTENNA WITH MULTIPLE GLOBAL NAVIGATION SATELLITE SYSTEM RECEIVERS

(71) Applicant: Accord Software & Systems Private Limited, Bengaluru (IN)

(72) Inventors: Shamanth Shetty, Bangalore (IN); Rakesh Ammunje Nayak, Bangalore (IN); Mahesh Kumar KV, Bangalore (IN); Raghavendra Manur Shenoy, Bangalore (IN)

(73) Assignee: Accord Ideation Private Limited, Bangalore (IN)

( * ) Notice: Subject to any disclaimer, the term of this patent is extended or adjusted under 35 U.S.C. 154(b) by 402 days.

(21) Appl. No.: 15/602,119

(22) Filed: May 23, 2017

(65) Prior Publication Data
US 2018/0341024 A1 Nov. 29, 2018

(51) Int. Cl.
*G01S 19/36* (2010.01)
*G01S 19/37* (2010.01)
(Continued)

(52) U.S. Cl.
CPC ............ *G01S 19/36* (2013.01); *G01S 19/37* (2013.01); *G01S 19/14* (2013.01); *G01S 19/33* (2013.01)

(58) Field of Classification Search
CPC ........... G01S 19/36; G01S 19/37; G01S 19/33
(Continued)

(56) References Cited

U.S. PATENT DOCUMENTS 6,002,363 A * 12/1999 Krasner ................ G01S 5/0036
342/357.62
6,064,336 A * 5/2000 Krasner ................ G01S 5/0036
342/357.75
(Continued)

FOREIGN PATENT DOCUMENTS

CN 2752871 1/2006
CN 203377867 1/2014

OTHER PUBLICATIONS

RTCA Special Committee 159 (SC-159), Minimum Operational Performance Standards for Global Navigation Satellite System (GNSS) Airborne Active Antenna Equipment for the L1 Frequency Band, RTCA/DO-301, Dec. 13, 2006, Washington, DC 20036-4001, USA.
(Continued)

*Primary Examiner* — Chuong P Nguyen
(74) *Attorney, Agent, or Firm* — Ashok Tankha

(57) ABSTRACT

A global navigation satellite system (GNSS) antenna sharing receiver (GNSSASR) for sharing a GNSS antenna with one or more secondary GNSS receivers is provided. The GNSSASR includes an input radio frequency (RF) port for receiving a GNSS signal from the GNSS antenna, one or more output RF ports for transmitting the GNSS signal to the secondary GNSS receivers, a coupler for reducing attenuation in the GNSS signal transmitted to the secondary GNSS receivers, a power supply circuit for supplying a direct current (DC) voltage with reduced loss to the GNSS antenna based on availability of a secondary GNSS receiver, and a current monitoring circuit for monitoring DC flow to the GNSS antenna from the power supply circuit, limiting an increase in the DC flow due to a fault in the GNSS antenna, and indicating a fault in the GNSS antenna to the GNSSASR and the secondary GNSS receivers.

20 Claims, 4 Drawing Sheets

(51) Int. Cl.
*G01S 19/14* (2010.01)
*G01S 19/33* (2010.01)

(58) Field of Classification Search
USPC .................. 342/357.73, 357.76, 357.77
See application file for complete search history.

(56) References Cited

U.S. PATENT DOCUMENTS

| | | | | |
|---|---|---|---|---|
| 6,069,583 A * | 5/2000 | Silvestrin | ................ | G01S 19/29 |
| | | | | 342/357.27 |
| 6,111,540 A * | 8/2000 | Krasner | ................ | G01S 5/0036 |
| | | | | 342/357.63 |
| 6,919,841 B2 | 7/2005 | Yamazaki | | |
| 7,171,173 B2 * | 1/2007 | Zangerl | ................... | G01S 19/36 |
| | | | | 342/357.76 |
| 7,245,678 B2 * | 7/2007 | Tanaka | ................. | H04B 7/0811 |
| | | | | 375/347 |
| 7,268,727 B2 * | 9/2007 | Montgomery | .......... | G01S 19/15 |
| | | | | 342/357.36 |
| 7,737,887 B2 * | 6/2010 | Remondi | ................ | G01S 19/41 |
| | | | | 342/357.44 |
| 7,737,888 B2 * | 6/2010 | Remondi | ................ | G01S 19/05 |
| | | | | 342/357.45 |
| 7,839,916 B1 * | 11/2010 | Luecke | ................... | G01S 19/12 |
| | | | | 375/147 |
| 7,859,457 B2 | 12/2010 | Koide | | |
| 8,264,404 B2 * | 9/2012 | Remondi | ................ | G01S 19/41 |
| | | | | 342/357.66 |
| 8,542,616 B2 * | 9/2013 | Staszewski | .......... | H03D 7/1441 |
| | | | | 370/295 |
| 2006/0197538 A1 * | 9/2006 | Leinonen | ................ | H01Q 1/243 |
| | | | | 324/533 |
| 2018/0095177 A1 * | 4/2018 | Peake | .................... | G01S 19/07 |

OTHER PUBLICATIONS

Navstar GPS Space Segment/Navigation User Interfaces, IS-GPS-200, Revision D, Dec. 7, 2004, Space and Missile Systems Center (SMC), CA 90245-4659,U.S.A.

* cited by examiner

SHARING OF A GLOBAL NAVIGATION SATELLITE SYSTEM ANTENNA WITH MULTIPLE GLOBAL NAVIGATION SATELLITE SYSTEM RECEIVERS

BACKGROUND

A global navigation satellite system (GNSS) is a satellite navigation system with global coverage and comprises the global positioning system (GPS), the Globalnaya Navigatsionnaya Sputnikovaya Sistema (GLONASS), the BeiDou navigation satellite system, Galileo, the independent regional navigation satellite system (IRNSS), and the quasi-zenith satellite system (QZSS). The GNSS is typically used for navigation on land, sea, and air. A vehicle, for example, an aircraft, a helicopter, a ship, a truck, etc., may have a navigation sensor with an inbuilt GNSS receiver on board with a standard GNSS antenna and cable assembly. The GNSS receiver comprises a radio frequency port that connects the GNSS receiver to the GNSS antenna via the cable assembly. The GNSS receiver processes GNSS signals transmitted by satellites, and determines position and velocity of the vehicle, and precise time. The GNSS signals transmitted by the satellites are weak radio frequency (RF) signals. Since the satellites are in motion, the GNSS receivers have to continuously acquire and track the transmitted GNSS signals from the satellites in view. The GNSS antenna captures the transmitted GNSS signals.

Global navigation satellite system (GNSS) antennas are of two types, namely, a passive GNSS antenna and an active GNSS antenna. The passive GNSS antenna has no amplification stages. The active GNSS antenna is an antenna with an integrated signal amplifier. The active GNSS antenna is used for receiving GNSS signals. The integrated signal amplifier boosts a GNSS signal picked up by the active GNSS antenna and allows for a longer remote cable run between the GNSS receiver and the active GNSS antenna. The cable between the GNSS receiver and the active GNSS antenna is a coaxial cable. On transmission of the received GNSS signal by the active GNSS antenna, the GNSS signal is attenuated throughout the length of the cable. The longer the cable, the larger is the loss in the strength of the transmitted GNSS signal. The integrated signal amplifier compensates for the loss of the GNSS signal strength by boosting the captured GNSS signal before transmitting the GNSS signal to the GNSS receiver.

In certain situations, a user of the global navigation satellite system (GNSS) receiver may need to upgrade performance of the navigation sensor of the vehicle by adding an additional GNSS receiver with improved capabilities to the existing GNSS receiver. Addition of the additional GNSS receiver requires an installer to drill holes on a vehicle surface to install an additional GNSS antenna, which significantly increases the cost of installation. Moreover, addition of the additional GNSS receiver requires adding long cable assemblies from the additional GNSS antenna to the additional GNSS receiver. As the number of parts of the active GNSS antennas, that is, the existing GNSS antenna and the additional GNSS antenna, installed on the vehicle increases, complexity in assembly of the parts of the GNSS antennas increases and results in additional weight of the setup of the additional GNSS antenna and significant costs for installation of the additional GNSS antenna. Long coaxial cable runs between the additional GNSS antenna and the additional GNSS receiver further increase the costs. Hence, there is a need for sharing the existing GNSS antenna by the existing GNSS receiver and the additional GNSS receiver to reduce the significant costs of installation and to avoid complexity of the setup created by long coaxial cable runs.

In a conventional system where a global navigation satellite system (GNSS) antenna is shared between two GNSS receivers, a radio frequency (RF) splitter is connected between the two GNSS receivers for splitting the received GNSS signal into two GNSS signals and feeding one GNSS signal each to the two GNSS receivers. Insertion of the RF splitter in a cable run between the GNSS receivers results in insertion losses and also division of power of the received GNSS signal. In the RF splitter, approximately 3 decibel (dB) loss of power of the GNSS signal received by the GNSS antenna is observed at each of the output ports of the RF splitter, thereby attenuating the split GNSS signal significantly. There is a need for splitting the received GNSS signal into multiple GNSS signals with minimal attenuation.

The active global navigation satellite system (GNSS) antenna needs power to operate. The GNSS receiver powers the GNSS antenna via a connecting coaxial cable. In a conventional system where the GNSS antenna is shared by two GNSS receivers using the radio frequency (RF) splitter, the power to the GNSS antenna is provided by the GNSS receiver that is connected to the GNSS antenna via a cable assembly. Consider an example where a first GNSS receiver and a second GNSS receiver share a GNSS antenna and the power to the GNSS antenna is supplied by the first GNSS receiver. The RF splitter is connected between the first GNSS receiver and the second GNSS receiver. If the first GNSS receiver that was supplying power to the GNSS antenna is switched off or disconnected from a power source, the GNSS antenna will not be powered any longer. The second GNSS receiver that is connected to the RF splitter, in turn, stops receiving the GNSS signal and stops tracking the satellites until power to the GNSS antenna is restored. There is a need for a method and a system for supplying power to the shared GNSS antenna by either one of the GNSS receivers based on availability of the GNSS receivers, where the GNSS receivers are powered independent of each other and therefore ensure uninterrupted power supply to the shared GNSS antenna when either of the GNSS receivers is powered off.

A global navigation satellite system (GNSS) antenna typically requires a direct current (DC) voltage of, for example, about 4 volts (V) to about 18 V to receive and transmit a GNSS signal to the first GNSS receiver. Consider an example where the power to the GNSS antenna is supplied by the second GNSS receiver. The DC voltage from the second GNSS receiver has to be passed to the GNSS antenna to indicate any fault in the GNSS antenna to the second GNSS receiver. The second GNSS receiver is connected to the GNSS antenna via the first GNSS receiver using a long cable. That is, DC voltage from the second GNSS receiver will have to pass through additional circuitry in the first GNSS receiver on the path to the GNSS antenna. Ohmic losses in the additional circuitry will introduce an additional voltage drop in the DC voltage. Ohmic losses along the long cable that connects the second GNSS receiver to the GNSS antenna also reduce the voltage supplied to the GNSS antenna. There is a significant voltage drop throughout the long cable. The minimum operating DC voltage of an airborne GNSS antenna is, for example, about 4.4 V and the GNSS receivers typically supply a DC voltage of 5 V. Thus, any voltage drop in the path to the GNSS antenna from the second GNSS receiver can reduce the margin of DC voltage required to operate the GNSS antenna. Due to the voltage drop, the voltage at the input of the GNSS antenna is reduced and the GNSS antenna ceases to perform the intended function of receiving and transmitting the GNSS signal to the first GNSS receiver. Therefore, there is a need for minimizing the attenuation of the DC voltage supplied to the GNSS antenna over the additional circuitry in the first GNSS receiver and the long cable to less than 0.35 V, when the GNSS antenna is shared between GNSS receivers.

In each global navigation satellite system (GNSS), errors are inherent. The GNSS receivers must compensate for the errors to provide a reliable output. If the errors are not corrected, the GNSS receivers may provide poor performance and unreliable output. The sources of errors in the GNSS comprise, for example, the positioning and clock of the satellites, navigation messages transmitted by each satellite, faults in the GNSS antenna, faults in the long run of the cables, noise in the design of the GNSS receivers, etc. Typically, a controller on the GNSS receiver detects a fault in the GNSS antenna or a fault in the long cables run between the GNSS receiver and the GNSS antenna by monitoring current drawn by the GNSS antenna or a voltage drop along the long cables. The controller alerts a user of the GNSS receiver of an occurrence of any such fault. In systems where the GNSS antenna is shared between two GNSS receivers, for example, a first GNSS receiver and a second GNSS receiver, the second GNSS receiver is not directly connected to the GNSS antenna. The second GNSS receiver is unaware of the fault in the GNSS antenna or the long cable between the GNSS antenna and the first GNSS receiver. Therefore, there is a need for a method and a system for detecting and indicating an occurrence of a fault in the GNSS antenna or the long cable run between the GNSS antenna and the first GNSS receiver to the second GNSS receiver, when the GNSS antenna is shared between the first GNSS receiver and the second GNSS receiver.

Hence, there is a long felt need for a global navigation satellite system (GNSS) antenna sharing receiver and a method for sharing a single GNSS antenna on a vehicle with more than one GNSS receiver without affecting an existing antenna and cable assembly in the vehicle. Moreover, there is a need for a GNSS antenna sharing receiver and a method for splitting the received GNSS signal between the GNSS receivers with minimal attenuation. Furthermore, there is a need for a GNSS antenna sharing receiver and a method for minimizing the attenuation of direct current (DC) voltage supplied to the GNSS antenna to less than 0.35V, when the GNSS antenna is shared between multiple GNSS receivers. Furthermore, there is a need for a method for supplying power to the GNSS antenna based on availability of the GNSS antenna sharing receiver and the GNSS receivers, where the GNSS antenna sharing receiver and the GNSS receivers are powered independent of each other. Furthermore, there is a need for a GNSS antenna sharing receiver and a method for detecting and indicating an occurrence of a fault in the GNSS antenna or the long cable run between the GNSS antenna and the GNSS receivers.

SUMMARY OF THE INVENTION

This summary is provided to introduce a selection of concepts in a simplified form that are further disclosed in the detailed description of the invention. This summary is not intended to determine the scope of the claimed subject matter.

The global navigation satellite system (GNSS) antenna sharing receiver and the method disclosed herein address the above recited need for sharing a single GNSS antenna on a vehicle with one or more secondary GNSS receivers without affecting an existing antenna and cable assembly in the vehicle. The method disclosed herein allows the GNSS antenna sharing receiver and the secondary GNSS receivers to share the GNSS antenna and cable setup of a pre-existing GNSS antenna and GNSS receiver setup in the vehicle. The method disclosed herein allows adding a new GNSS receiver onto the existing setup without compromising the installed performance of the existing setup. In the method disclosed herein, the GNSS antenna sharing receiver is installed in the vehicle and connected to the GNSS antenna using a radio frequency (RF) cable and allows sharing of the GNSS antenna with one or more secondary GNSS receivers, without affecting performance of the GNSS antenna sharing receiver and the secondary GNSS receivers. Moreover, the GNSS antenna sharing receiver disclosed herein splits the GNSS signal received from the GNSS antenna between the GNSS antenna sharing receiver and the secondary GNSS receivers with minimal attenuation. Furthermore, the GNSS antenna sharing receiver disclosed herein minimizes the attenuation of direct current (DC) voltage supplied to the GNSS antenna to less than 0.35V, when the GNSS antenna is shared between multiple GNSS receivers. Furthermore, the GNSS antenna sharing receiver disclosed herein supplies power to the GNSS antenna on unavailability of the secondary GNSS receivers, where the GNSS antenna sharing receiver and the secondary GNSS receivers are powered independent of each other. Furthermore, the GNSS antenna sharing receiver disclosed herein detects and indicates occurrence of a fault in the GNSS antenna or in a long cable run between the GNSS antenna and the GNSS antenna sharing receiver to the secondary GNSS receivers, when the GNSS antenna is shared by the GNSS antenna sharing receiver and the secondary GNSS receivers. The GNSS antenna sharing receiver monitors current internally and externally from the secondary GNSS receivers and routes the current to the GNSS antenna irrespective of which GNSS receiver is powered on.

The global navigation satellite system (GNSS) antenna sharing receiver disclosed herein comprises an input radio frequency (RF) port, one or more output RF ports, a coupler, a power supply circuit, and a current monitoring circuit. The input RF port is operably connected to the GNSS antenna for receiving a GNSS signal. One or more output radio frequency ports are operably connected to input RF ports of the secondary GNSS receivers for transmitting a first portion of the received GNSS signal to the secondary GNSS receivers. The coupler is operably coupled between the input RF port and the output RF ports of the GNSS antenna sharing receiver for splitting the received GNSS signal into a first portion and a second portion. The coupler transmits the first portion of the received GNSS signal to the secondary GNSS receivers and the second portion of the received GNSS signal to a baseband processor of the GNSS antenna sharing receiver. The coupler reduces attenuation in the first portion of the received GNSS signal transmitted to the secondary GNSS receivers.

The power supply circuit is operably connected between the input radio frequency (RF) port and the output RF ports of the global navigation satellite system (GNSS) antenna sharing receiver for supplying power to the GNSS antenna. The power supply circuit comprises a first switch, a second switch, and a switch selector. The first switch of the power supply circuit is operably connected between one of the output RF ports and the input RF port of the GNSS antenna sharing receiver for supplying a first direct current (DC) voltage from one of the secondary GNSS receivers to the GNSS antenna. The second switch of the power supply circuit is operably connected between a power supply regulator and the input RF port of the GNSS antenna sharing receiver for transmitting a second DC voltage supplied by the power supply regulator to the GNSS antenna, when the secondary GNSS receivers are not available. The switch selector of the power supply circuit is operably connected to the first switch and the second switch for selectively activating the first switch and the second switch to supply the first DC voltage or the second DC voltage respectively, to the GNSS antenna based on availability of one of the secondary GNSS receivers.

The current monitoring circuit is in operable communication with the power supply circuit for monitoring flow of direct current (DC) to the global navigation satellite system (GNSS) antenna from the power supply circuit. The current monitoring circuit also limits an increase in the flow of the DC to the GNSS antenna due to a fault in the GNSS antenna or a cable connecting the GNSS antenna sharing receiver to the GNSS antenna. The current monitoring circuit also generates a fault signal for indicating an overload condition or an open condition of the GNSS antenna to the GNSS antenna sharing receiver and the secondary GNSS receivers. The current monitoring circuit reduces loss in the first DC voltage supplied to the GNSS antenna from one of the secondary GNSS receivers using a load switch.

In the method disclosed herein, there is no dependency on which global navigation satellite system (GNSS) receiver, that is, whether the GNSS antenna sharing receiver or any of the secondary GNSS receivers is being powered on. The method disclosed herein does not require all the GNSS receivers to be powered on at all times. Any or all the GNSS receivers can be operational at any given time. Moreover, in the method disclosed herein, the secondary GNSS receivers pass the direct current (DC) voltage to the GNSS antenna through the GNSS antenna sharing receiver with, for example, less than a 0.35 V DC drop. Furthermore, the method disclosed herein ensures that the GNSS signal loss to the secondary GNSS receivers, where the GNSS signal passes to the secondary GNSS receivers through the GNSS antenna sharing receiver, does not suffer more than a 1.0 decibel (dB) attenuation. The method disclosed herein also ensures that the GNSS signal is available to the secondary GNSS receivers even though the GNSS antenna sharing receiver is switched off. The method disclosed herein also ensures that the fault in the GNSS antenna or the cable that connects the GNSS antenna to the GNSS antenna sharing receiver is made visible to the secondary GNSS receivers and is communicated to the GNSS antenna sharing receiver and the secondary GNSS receivers, even if the GNSS antenna sharing receiver is switched off. The GNSS antenna sharing receiver notifies the user of the correct health status of the GNSS antenna even when any or all the GNSS receivers are operational. Furthermore, the method disclosed herein ensures that the input radio frequency (RF) port and the output RF ports of the GNSS antenna sharing receiver are protected for induced lightning transients.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
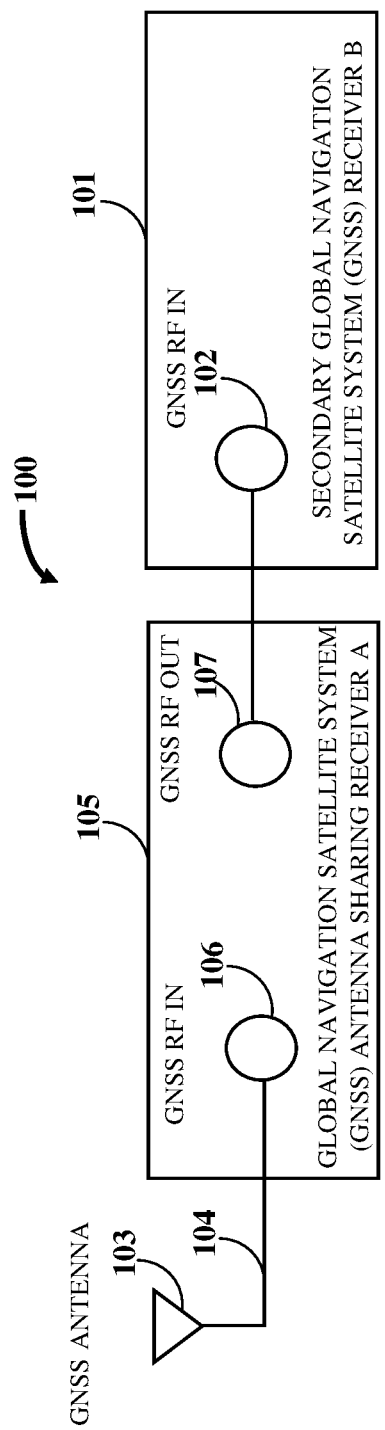
FIG. 1 exemplarily illustrates a communication system, showing sharing of a global navigation satellite system antenna between a global navigation satellite system antenna sharing receiver and a secondary global navigation satellite system receiver.

FIG. 1 exemplarily illustrates a communication system 100, showing sharing of a global navigation satellite system (GNSS) antenna 103 between a GNSS antenna sharing receiver 105 and a secondary GNSS receiver 101. For purposes of illustration, the detailed description refers to sharing of the GNSS antenna 103 between two GNSS receivers, that is, the GNSS antenna sharing receiver 105 and a single secondary GNSS receiver 101; however the scope of the method and the GNSS antenna sharing receiver 105 disclosed herein is not limited to sharing of the GNSS antenna 103 between two GNSS receivers but may be extended to sharing of the GNSS antenna 103 between multiple GNSS receivers via the GNSS antenna sharing receiver 105. The GNSS antenna sharing receiver 105 is installed in a vehicle (not shown) and connected to the GNSS antenna 103 using a radio frequency (RF) cable 104. The GNSS antenna sharing receiver 105 receives multiple GNSS signals from multiple GNSS satellites at any point in time using the GNSS antenna 103 via the RF cable 104. For each of the GNSS satellites, the GNSS antenna sharing receiver 105 recovers information contained in the received GNSS signals regarding position and velocity of the vehicle, and precise time. The secondary GNSS receiver 101 is a standard GNSS receiver with a GNSS input RF port 102 that is added to the setup of the GNSS antenna 103 and the GNSS antenna sharing receiver 105. In an embodiment, the secondary GNSS receiver 101 is an incumbent GNSS receiver on the vehicle. The secondary GNSS receiver 101 shares the GNSS antenna 103 with the GNSS antenna sharing receiver 105.

The global navigation satellite system (GNSS) antenna 103 is an active internal antenna or an active external antenna. An active antenna is an integrated or hermetically sealed antenna that contains active amplifiers and filters to boost and filter a GNSS signal before the GNSS signal is passed to the GNSS antenna sharing receiver 105 for processing. As used herein, "active internal antenna" refers to an active antenna inside the GNSS antenna sharing receiver 105. Also, as used herein, "active external antenna" refers to an active antenna mounted externally on the surface of the GNSS antenna sharing receiver 105 or on a vehicle integrated with the GNSS antenna sharing receiver 105. In an embodiment, the GNSS antenna sharing receiver 105 is used with passive antenna configurations, provided the cable looming losses from the GNSS antenna 103 to the GNSS antenna sharing receiver 105 or the secondary GNSS receiver 101 are small. The GNSS antenna sharing receiver 105 or the secondary GNSS receiver 101 supplies a DC voltage to the GNSS antenna 103. The GNSS antenna 103 is powered via the GNSS antenna sharing receiver 105 where direct current is passed through the radio frequency (RF) cable 104 to the GNSS antenna 103 and power-regulated within the GNSS antenna 103. A power source, for example, batteries, a filtered power supply, a phantom power, etc., supplies the direct current to the GNSS antenna 103. In an embodiment, the GNSS antenna 103 is a passive antenna where loss in the GNSS signal over the RF cable 104 between the GNSS antenna 103 and the GNSS antenna sharing receiver 105 is substantially low. In this embodiment, the direct current flowing through the RF cable 104 to the GNSS antenna 103 does not damage a radiating element of the GNSS antenna 103.

As exemplarily illustrated in FIG. 1, the communication system 100 comprises two global navigation satellite system (GNSS) receivers, namely, the GNSS antenna sharing receiver A 105 and a secondary GNSS receiver B 101 that share the GNSS antenna 103. In an embodiment (not shown), multiple secondary GNSS receivers share the GNSS antenna 103 with the GNSS antenna sharing receiver A 105. The GNSS antenna sharing receiver A 105 receives GNSS signals over the RF cable 104 from the GNSS antenna 103 via an input radio frequency (RF) port 106. The secondary GNSS receiver B 101 receives GNSS signals via an input RF port 102. In addition to the input RF port 106, the GNSS antenna sharing receiver A 105 comprises an output RF port 107 for transmitting a GNSS signal received through the input RF port 106 of the GNSS antenna sharing receiver A 105 to the secondary GNSS receiver B 101. The input RF port 102 of the secondary GNSS receiver B 101 is connected to the output RF port 107 of the GNSS antenna sharing receiver A 105. In the embodiment (not shown), where the communication system 100 comprises multiple secondary GNSS receivers similar to the secondary GNSS receiver B 101, the GNSS antenna sharing receiver A 105 comprises multiple output RF ports (not shown) similar to the output RF port 107 for transmitting the received GNSS signals to input RF ports (not shown) similar to the input RF port 102, of the secondary GNSS receivers simultaneously. The cable connected between the GNSS antenna 103 and the secondary GNSS receivers is limited by cable loss in the RF cable 104. Cable loss in the RF cable 104 between the GNSS antenna 103 and the GNSS antenna sharing receiver A 105 should not exceed 10 dB for proper functioning of the GNSS antenna sharing receiver A 105. The cable loss depends on the quality of the RF cable 104 and the length of the RF cable 104.

Figure 2:
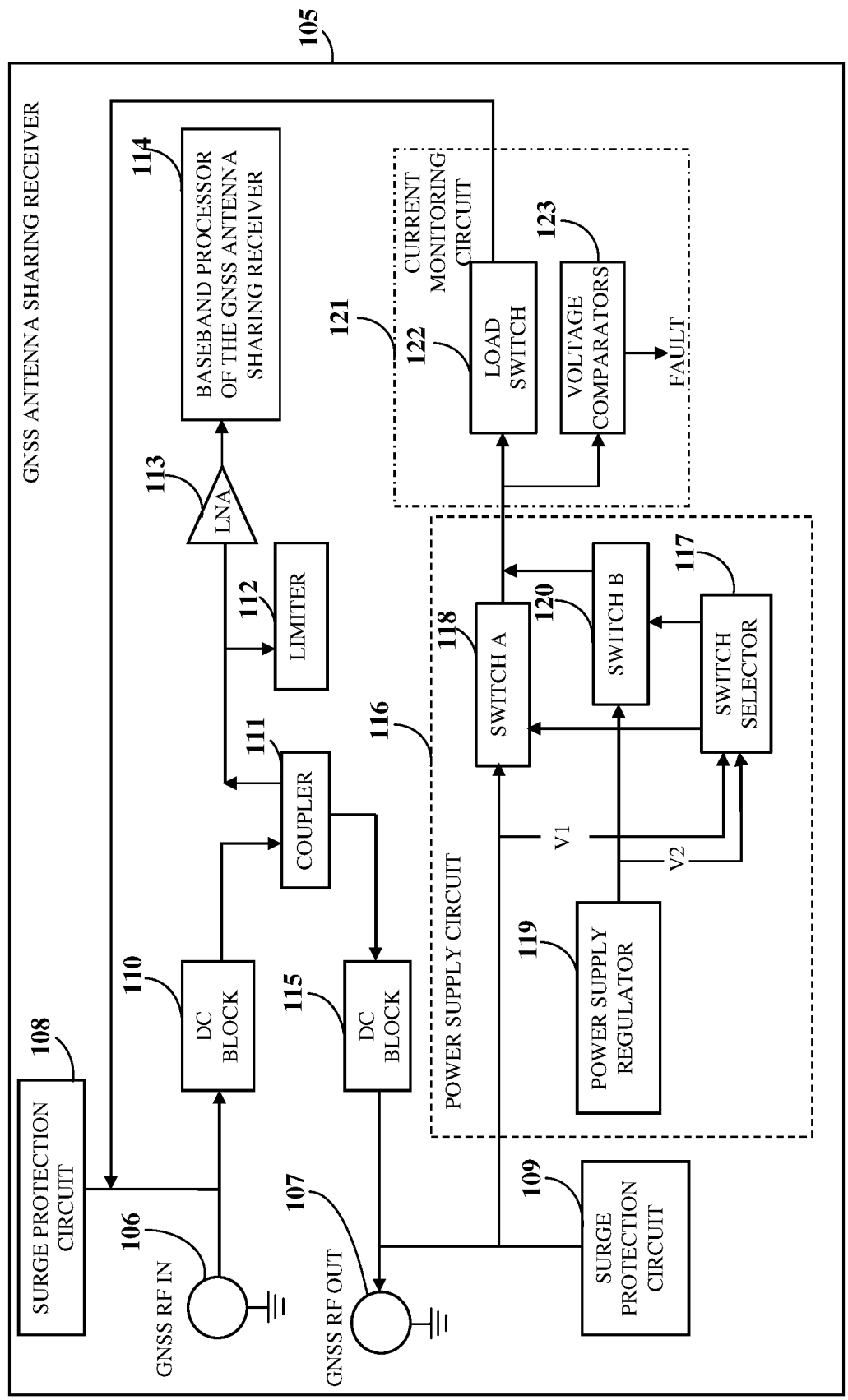
FIG. 2 exemplarily illustrates a schematic diagram of the global navigation satellite system antenna sharing receiver for sharing a global navigation satellite system antenna with a secondary global navigation satellite system receiver and detecting a fault in the global navigation satellite system antenna.

FIG. 2 exemplarily illustrates a schematic diagram of the global navigation satellite system (GNSS) antenna sharing receiver 105 for sharing a GNSS antenna 103 with a secondary GNSS receiver 101 exemplarily illustrated in FIG. 1, and detecting a fault in the GNSS antenna 103. The GNSS antenna sharing receiver 105 disclosed herein comprises an input radio frequency (RF) port 106, an output RF port 107, a coupler 111, a power supply circuit 116, and a current monitoring circuit 121. The input RF port 106 is operably connected to the GNSS antenna 103 for receiving a GNSS signal. The output RF port 107 is operably connected to an input RF port 102 of the secondary GNSS receiver 101. The output RF port 107 transmits a first portion of the received GNSS signal to the secondary GNSS receiver 101. The coupler 111 is operably coupled between the input RF port 106 and the output RF port 107 of the GNSS antenna sharing receiver 105. The coupler 111 splits the received GNSS signal into the first portion and a second portion. The coupler 111 is a passive device in an RF front end section of the GNSS antenna sharing receiver 105 and functions independent of power being supplied to the GNSS antenna sharing receiver 105. The coupler 111 ensures the GNSS signal is available to the secondary GNSS receiver 101 even when the GNSS antenna sharing receiver 105 is not available. The GNSS antenna sharing receiver 105 is not available when the GNSS antenna sharing receiver 105 is not powered on or is taken down for maintenance. When the GNSS antenna sharing receiver 105 is not available, the secondary GNSS receiver 101 is powered on independently. The coupler 111 transmits the second portion of the received GNSS signal to a baseband processor 114 of the GNSS antenna sharing receiver 105.

In an embodiment, the coupler 111 is a directional coupler with multiple ports, for example, an input port (not shown), a transmitted port (not shown), a coupled port (not shown), and an isolated port (not shown). On the input port, the coupler 111 receives the global navigation satellite system (GNSS) signal from the GNSS antenna 103 via the input RF port 106. On the transmitted port of the coupler 111, the coupler 111 transmits the first portion of the received GNSS signal to the secondary GNSS receiver 101 via the output RF port 107 with minimal attenuation. On the coupled port, the coupler 111 transmits the second portion of the received GNSS signal to the baseband processor 114 of the GNSS antenna sharing receiver 105. The coupled port of the coupler 111 is connected to the baseband processor 114 of the GNSS antenna sharing receiver 105 after sufficient amplification, which increases noise figure of the GNSS antenna sharing receiver 105 without impacting the noise figure of the secondary GNSS receiver 101. Noise figure is a measure of degradation of signal-to-noise ratio, caused by components in the radio frequency (RF) front end section of the GNSS antenna sharing receiver 105. The noise figure is used to quantify performance of the components and/or system elements in the RF front end section of the GNSS antenna sharing receiver 105. The isolated port of the coupler 111 is terminated with a matched load, that is, a termination resistor.

The coupler 111 transmits the first portion of the received global navigation satellite system (GNSS) signal to the secondary GNSS receiver 101 with reduced attenuation. That is, an insertion loss due to the coupler 111 in the first portion of the received GNSS signal is, for example, less than or equal to about 0.6 decibels (dB). Insertion loss is the loss in power of the received GNSS signal due to insertion of the coupler 111 in a signal transmission line between the GNSS antenna sharing receiver 105 and the secondary GNSS receiver 101. The insertion loss is measured between the input port and the transmitted port of the coupler 111. The coupler 111 transmits the second portion of the received GNSS signal to the baseband processor 114 of the GNSS antenna sharing receiver 105 with a coupling loss of, for example, about 6 dB to about 8 dB. Coupling loss is the loss in power of the received GNSS signal on being coupled to the coupled port of the coupler 111. The coupling loss is measured between the input port and the coupled port of the coupler 111. The coupler 111 permits the received GNSS signal to pass from the input port to the coupled port of the coupler 111 with substantially less coupling loss and at the same time samples a forward power, that is, the power flowing from the input port to the transmitted port with a prefixed ratio. For example, a 6 dB coupler transmits 25% of power of the received GNSS signal at the input port to the coupled port; a 10 dB coupler transmits 10% of power of the received GNSS signal at the input port to the coupled port; and a 20 dB coupler transmits 1% of power of the received GNSS signal at the input port to the coupled port. Since the coupler 111 is a passive device, the sum of powers on both the ports, that is, the transmitted port and the coupled port is equal to the input power. Therefore, a tight coupling between the input port and the coupled port of the coupler 111 will leave only the remaining power to be transmitted to the transmitted port of the coupler 111.

In an example, for a 6 dB coupler fed with a global navigation satellite system (GNSS) signal with 1 milliwatt (mW) of power at the input port, power of the first portion of the received GNSS signal transmitted to the transmitted port is 0.75 mW and power of the second portion of the received GNSS signal transmitted to the coupled port is 0.25 mW. For a 10 dB coupler, 90% of the input power is transmitted to the transmitted port and 10% of the input power is transmitted to the coupled port. Thus, higher the coupling between the input port and the coupled port, lower is the coupling loss. That is, by introducing the coupler 111 with a higher coupling, the received GNSS signal is minimally attenuated during transmission of the received GNSS signal to the secondary GNSS receiver 101. In the GNSS antenna sharing receiver 105 disclosed herein, a coupler with 25% of the input power of the received GNSS signal transmitted to the coupled port and 75% of the input power of the received GNSS signal transmitted to the transmitted port is desired. Thus, the coupler 111 with a coupling ratio of 6 dB is employed in the GNSS antenna sharing receiver 105. Coupling ratio is the ratio of power of the second portion of the received GNSS signal at the coupled port of the coupler 111 to the power of the received GNSS signal at the input port of the coupler 111. In an embodiment, a number of secondary GNSS receivers that can share the GNSS antenna 103 with the GNSS antenna sharing receiver 105 can be realized by a daisy chain configuration. The performance of the daisy chain configuration can be maintained provided insertion loss due to a cascaded coupler does not exceed a total loss of 10 dB from the GNSS antenna 103 to the last cascaded secondary GNSS receiver in the daisy chain.

The global navigation satellite system (GNSS) antenna sharing receiver 105 further comprises a low noise amplifier (LNA) 113 operably connected between the coupler 111 and the baseband processor 114 of the GNSS antenna sharing receiver 105. The low noise amplifier 113 amplifies the second portion of the received GNSS signal prior to transmitting the second portion of the received GNSS signal to the baseband processor 114 of the GNSS antenna sharing receiver 105, thereby compensating an additional signal loss due the coupler 111. The noise figure of the GNSS antenna sharing receiver 105 degrades, for example, by 6 dB because of the coupled loss of 6 dB of the coupler 111 by the same amount. However, the GNSS antenna 103 connected to the GNSS antenna sharing receiver 105 is an active antenna with a gain of, for example, more than 26 dB. Hence, the overall noise figure of the communication system 100 exemplarily illustrated in FIG. 1, is determined by the gain of the GNSS antenna 103 and the noise figure of the GNSS antenna sharing receiver 105. Because of the gain available in the GNSS antenna 103, the additional noise figure because of the coupler 111 in the GNSS antenna sharing receiver 105 is compensated.

The following computation shows there is no degradation in the noise figure of the communication system 100 due the degradation of the noise figure of the global navigation satellite system (GNSS) antenna sharing receiver 105. The overall noise figure ($NF_{dB}$) of the cascaded radio frequency (RF) communication system 100 comprising the GNSS antenna sharing receiver 105 and the secondary GNSS receiver 101 is calculated using the following Friis formula:

$$F=F_1+(F_2-1)/G_1+(F_3-1)/G_1G_2+\ldots+(F_{n-1})/G_1G_2\ldots G_{n-1}$$

$$NF_{dB}=10*Log_{10}(F)$$

where "F" indicates the noise factor, "G" indicates the power gain, and "n" is the number of stages in the cascaded radio frequency (RF) communication system 100.

Consider the following cases from Case 1 through Case 3 that show that the degradation in the noise figure of the cascaded radio frequency (RF) communication system 100 due to implementation of the global navigation satellite system (GNSS) antenna sharing receiver 105 is only fraction of a dB and negligible. Case 3 shows there is no degradation in the system noise figure of the secondary GNSS receiver 101.

Case 1: The system noise figure (NF) of a standard global navigation satellite system (GNSS) receiver (not shown) with an active GNSS antenna (not shown) and without an antenna sharing subsystem as implemented in the GNSS antenna sharing receiver 105, is calculated as follows:
Gain of a preamplifier in the active GNSS antenna, G1=398.1 (26 dB)
Noise factor of the preamplifier in the active GNSS antenna, F1=2.51 (4 dB)
Cable loss, G2=0.1 (−10 dB)
Noise factor of the cable that connects the active GNSS antenna to the standard GNSS receiver, F2=10 (10 dB)
Cascaded system noise figure, NF=4.03 dB Case 2: The system noise figure (NF) of the global navigation satellite system (GNSS) antenna sharing receiver 105 connected to the active GNSS antenna 103 exemplarily illustrated in FIGS. 1-2, is calculated as follows:
Gain of a preamplifier in the active GNSS antenna 103, G1=398.1 (26 dB)
Noise factor of the preamplifier in the active GNSS antenna 103, F1=2.51 (4 dB)
Cable loss+Coupled path loss, G2=−10 dB−6 dB=−16 dB=0.0251
Noise factor of the radio frequency (RF) cable 104+the coupler 111, F2=39.8 (16 dB)
Gain of the low noise amplifier 113, G3=100 (20 dB)
Noise factor of the low noise amplifier 113, F3=1.122 (0.5 dB)
Cascaded system noise figure, NF=4.17 dB Case 3: The system noise figure of the secondary global navigation satellite system (GNSS) receiver 101 connected to the active GNSS antenna 103 via the GNSS antenna sharing receiver 105 of the cascaded radio frequency (RF) communication system 100 exemplarily illustrated in FIGS. 1-2, is calculated as follows:

Gain of the preamplifier in the active GNSS antenna 103, G1=398.1 (26 dB)

Noise factor of the preamplifier in the GNSS antenna 103, F1=2.51 (4 dB)

Cable loss+insertion loss due to the coupler 111, G2=−10 dB−0.5 dB=−10.5 dB=0.0316

Noise factor of the RF cable 104+the coupler 111, F2=31.6 (10.5 dB)

Cascaded system noise figure NF=4.04 dB

As exemplarily illustrated in Table 1 below, the noise figure of the RF front end section of the global navigation satellite system (GNSS) antenna sharing receiver 105 comprising the coupler 111 is 1 dB, while the noise figure of a GNSS receiver with a splitter is 3.5 dB. That is, the received GNSS signal is degraded by 3.5 dB in the GNSS receiver with a splitter compared to a 1 dB attenuation of the received GNSS signal in the GNSS antenna sharing receiver 105 with the coupler 111. The carrier to noise density ratio ($C/N_0$) degradation for the RF front end section of the GNSS antenna sharing receiver 105 comprising the coupler 111 is 1 dB/Hz. The $C/N_0$ degradation for the RF front end section of the GNSS receiver with a splitter is 3.5 dB/Hz. Thus, the GNSS antenna sharing receiver 105 with the coupler 111 has a reduced noise figure and the received GNSS signal is less attenuated. In the GNSS antenna sharing receiver 105 disclosed herein, an improvement of 2.5 dB in the noise figure and the $C/N_0$ is achieved.

TABLE 1

|  | GNSS receiver with a splitter | GNSS antenna sharing receiver with a coupler |
| --- | --- | --- |
| Noise Figure | 3.5 dB | 1 dB |
| $C/N_0$ degradation | 3.5 dB/Hz | 1 dB/Hz |

The global navigation satellite system (GNSS) antenna sharing receiver 105 further comprises a limiter 112 operably connected between the coupler 111 and the low noise amplifier 113. The limiter 112, for example, a shunt limiter, limits the second portion of the received GNSS signal prior to transmitting the second portion of the received GNSS signal to the baseband processor 114 of the GNSS antenna sharing receiver 105. The limiter 112 prevents the low noise amplifier 113 from destruction by the second portion of the received GNSS signal whose strength is substantially high. The limiter 112 offers a relatively high shunt impedance to the second portion of the received GNSS signal, when the second portion of the received GNSS signal is weak. Therefore, there is no attenuation of the second portion of the received GNSS signal. As the strength of the second portion of the received GNSS signal level increases, shunt impedance of the limiter 112 decreases resulting in higher loss of power of the second portion of the received GNSS signal. At a predetermined strength of the second portion of the received GNSS signal, the limiter 112 ensures that the loss of power of the second portion of the received GNSS signal is constant and the second portion of the received GNSS signal transmitted to the baseband processor 114 of the GNSS antenna sharing receiver 105 does not fluctuate. The coupler 111 transmits the first portion of the received GNSS signal to the secondary GNSS receiver 101, and with the help of the low noise amplifier 113 and the limiter 112, transmits the second portion of the received GNSS signal to the baseband processor 114 of the GNSS antenna sharing receiver 105 with reduced signal loss.

The global navigation satellite system (GNSS) antenna sharing receiver 105 further comprises direct current (DC) blocks 110 and 115. As exemplarily illustrated in FIG. 2, one DC block 110 is operably connected between the input radio frequency (RF) port 106 of the GNSS antenna sharing receiver 105 and the coupler 111, and another DC block 115 is operably connected between the coupler 111 and the output RF port 107 of the GNSS antenna sharing receiver 105. The DC blocks 110 and 115 preclude DC voltages in the received GNSS signal from entering the GNSS antenna sharing receiver 105. In an embodiment, the DC block 110 precludes DC voltages in the received GNSS signal from exiting out of the GNSS antenna sharing receiver 105.

The power supply circuit 116 of the global navigation satellite system (GNSS) antenna sharing receiver 105 supplies power, for example, in the form of a direct current (DC) voltage to the GNSS antenna 103. The DC voltage supplied is in the range of, for example, about 4 volts (V) to about 18 V. The power supply circuit 116 is operably connected between the input radio frequency (RF) port 106 and the output RF port 107 of the GNSS antenna sharing receiver 105. The GNSS antenna sharing receiver 105 or the secondary GNSS receiver 101 can provide the DC voltage to the GNSS antenna 103, for example, from batteries, a filtered power supply, or through a phantom power in the GNSS antenna sharing receiver 105 or the secondary GNSS receiver 101. The GNSS antenna sharing receiver 105 supplies the DC voltage to the GNSS antenna 103 through the RF cable 104 that connects the GNSS antenna 103 to the GNSS antenna sharing receiver 105. Since the secondary GNSS receiver 101 is not connected to the GNSS antenna 103 directly, the secondary GNSS receiver 101 connected to the output RF port 107 of the GNSS antenna sharing receiver 105 supplies the DC voltage to the GNSS antenna 103 via the GNSS antenna sharing receiver 105.

As exemplarily illustrated in FIG. 2, the power supply circuit 116 comprises a switch A 118, a switch B 120, a power supply regulator 119, and a switch selector 117. The switch A 118 is operably connected between the output radio frequency (RF) port 107 and the input RF port 106 of the global navigation satellite system (GNSS) antenna sharing receiver 105. The switch A 118 connects to the secondary GNSS receiver 101 via the output RF port 107 for supplying a direct current (DC) voltage V1 from the secondary GNSS receiver 101 to the GNSS antenna 103. The power supply regulator 119 supplies a DC voltage V2 from the power supply regulator 119 to the GNSS antenna 103. The switch B 120 is operably connected between the power supply regulator 119 and the input RF port 106 of the GNSS antenna sharing receiver 105. The switch selector 117 is operably connected to the switch A 118 and the switch B 120. The switch selector 117 selectively activates the switch A 118 to supply the DC voltage V1 and the switch B 120 to supply the DC voltage V2 to the GNSS antenna 103 based on availability of the secondary GNSS receiver 101. In an embodiment, the switch selector 117 grants high priority to the secondary GNSS receiver 101 to supply the DC voltage V1 to the GNSS antenna 103. The switch selector 117 activates the switch A 118 and deactivates the switch B 120 for supplying the DC voltage V1 from the secondary GNSS receiver 101 to the GNSS antenna 103, if the secondary GNSS receiver 101 is available. The switch selector 117 deactivates the switch A 118 and activates the switch B 120 for supplying the DC voltage V2 from the power supply regulator 119 in the GNSS antenna sharing receiver 105 to the GNSS antenna 103, if the secondary GNSS receiver 101 is not available. The secondary GNSS receiver 101 is deemed not available, for example, if the secondary GNSS receiver 101 is not powered on or is under maintenance.

The switch selector 117 determines availability of the secondary global navigation satellite system (GNSS) receiver 101 based on the direct current (DC) voltage generated by the secondary GNSS receiver 101. The secondary GNSS receiver 101 that supplies the DC voltage is selected by the switch selector 117 for supplying the DC voltage to the GNSS antenna 103. The power supply circuit 116 ensures a voltage drop, for example, less than about 0.35 V in the DC voltage V1 supplied to the GNSS antenna 103 from the secondary GNSS receiver 101 via the global navigation satellite system (GNSS) antenna sharing receiver 105. The switch selector 117 allows maintenance activities to be performed on either the GNSS antenna sharing receiver 105 or the secondary GNSS receiver 101, while ensuring an uninterrupted power supply to the GNSS antenna 103. The downtime of the GNSS antenna 103, the GNSS antenna sharing receiver 105, and the secondary GNSS receiver 101 is reduced because of the uninterrupted power supply provided to the GNSS antenna 103.

The current monitoring circuit 121 of the global navigation satellite system (GNSS) antenna sharing receiver 105 is in operable communication with the power supply circuit 116 for monitoring flow of direct current to the GNSS antenna 103 from the power supply circuit 116. The current monitoring circuit 121 limits an increase in the flow of direct current to the GNSS antenna 103 due to a fault in the GNSS antenna 103 or the radio frequency (RF) cable 104 that connects the GNSS antenna sharing receiver 105 to the GNSS antenna 103. The fault in the GNSS antenna 103 is defined, for example, by an open condition or an overload condition of the GNSS antenna 103. An open condition of the GNSS antenna 103 occurs when the RF cable 104 between the GNSS antenna 103 and the GNSS antenna sharing receiver 105 is broken. When open, the RF cable 104 exhibits high impedance to the power supply circuit 116 and the GNSS antenna 103 draws less direct current from the power supply circuit 116. An overload condition of the GNSS antenna 103 occurs when the RF cable 104 between the GNSS antenna 103 and the GNSS antenna sharing receiver 105 is shorted. When shorted, the GNSS antenna 103 draws more direct current from the power supply circuit 116 resulting in an overload condition. The overload condition or a short circuit condition of the GNSS antenna 103 is detrimental to internal circuitry of the GNSS antenna sharing receiver 105 and the secondary GNSS receiver 101 since the GNSS antenna 103 in the overload condition cannot draw appropriate direct current from the GNSS antenna sharing receiver 105 or the secondary GNSS receiver 101. The current monitoring circuit 121 limits the current flowing to the GNSS antenna 103 and indicates the occurrence of the overload condition of the GNSS antenna 103 to the GNSS antenna sharing receiver 105 and the secondary GNSS receiver 101 to ensure a substantially continuous operation of the GNSS antenna sharing receiver 105 and the secondary GNSS receiver 101.

The fault in the global navigation satellite system (GNSS) antenna 103 occurs, for example, due to a fault in the radio frequency (RF) cable 104 between the GNSS antenna sharing receiver 105 and the GNSS antenna 103. The current monitoring circuit 121 generates a fault signal for indicating an overload condition or an open condition of the GNSS antenna 103 to the GNSS antenna sharing receiver 105 and the secondary GNSS receiver 101. In an embodiment, the current monitoring circuit 121 comprises a load switch 122 and voltage comparators 123. The load switch 122 is in operable communication with the switch A 118 and the switch B 120, between the input RF port 106 and the output RF port 107 of the GNSS antenna sharing receiver 105. The direct current (DC) supplied by the power supply circuit 116 flows through the load switch 122 to the input RF port 106 of the GNSS antenna sharing receiver 105. The load switch 122 monitors flow of direct current to the GNSS antenna 103 from the power supply circuit 116 and limits an increase or a decrease in the flow of direct current through the switch A 118 and the switch B 120 due to a fault in the GNSS antenna 103 and/or the RF cable 104 that connects the GNSS antenna sharing receiver 105 to the GNSS antenna 103. The load switch 122 limits excess current flowing through the switch A 118 and the switch B 120, when there is a fault in the RF cable 104 that connects the GNSS antenna sharing receiver 105 to the GNSS antenna 103. If the current flowing through the load switch 122 drops below a certain preset level or exceeds a preset level, the voltage comparators 123 generate a fault signal to indicate an overload condition or an open condition of the GNSS antenna 103 to the GNSS antenna sharing receiver 105 and the secondary GNSS receiver 101. The load switch 122 reduces loss in the DC voltage V1 supplied to the GNSS antenna 103 from the secondary GNSS receiver 101. The load switch 122 is in series with the switch A 118 or the switch B 120, as exemplarily illustrated in FIG. 2, and the voltage drop across the load switch 122 and the switch A 118 or the switch B 120 is about 0.35V.

The global navigation satellite system (GNSS) antenna sharing receiver 105 further comprises surge protection circuits 108 and 109 positioned at the input radio frequency (RF) port 106 and the output RF port 107 of the GNSS antenna sharing receiver 105 respectively. The surge protection circuits 108 and 109 protect the GNSS antenna sharing receiver 105 and the secondary GNSS receiver 101 from lightning induced transients. That is, the surge protection circuits 108 and 109 prevent any lightning induced transients from entering into the GNSS antenna sharing receiver 105, which is useful, for example, in aircraft installations. The surge protection circuits 108 and 109 comprise devices designed to protect electric devices such as the GNSS receivers 101 and 105 from voltage spikes. The voltage spikes are a result of the lightning induced transients. Total outage of the GNSS antenna sharing receiver 105 and the secondary GNSS receiver 101 can occur due to damage to insulation of the RF cables, for example, the RF cable 104 that connects the GNSS antenna sharing receiver 105 to the GNSS antenna 103. Any damage degrades the lifespan of the GNSS antenna sharing receiver 105 and the secondary GNSS receiver 101 and results in downtime of the communication system 100 exemplarily illustrated in FIG. 1. To ensure continuous operation of the GNSS antenna sharing receiver 105 and the secondary GNSS receiver 101, the surge protection circuits 108 and 109 are suitably deployed in the GNSS antenna sharing receiver 105. The surge protection circuits 108 and 109 limit the voltage spikes by either blocking or shorting voltages above a safe threshold. Devices that form part of the surge protection circuits 108 and 109 comprise, for example, a metal oxide varistor (MOV), a transient voltage suppression (TVS) diode, a thyristor surge protection device (TSPD), a gas discharge tube (GDT), a selenium voltage suppressor, etc. When the GNSS antenna sharing receiver 105 is installed on an aircraft fuselage, the surge protection circuits 108 and 109 are required as the aircraft fuselage is susceptible to the lightning induced transients. The surge protection circuits 108 and 109 protect the GNSS antenna sharing receiver 105 from indirect lightning transient currents that propagate through the RF cables, for example, 104 connected between the GNSS antenna 103, the GNSS antenna sharing receiver 105, and the secondary GNSS receiver 101.

Figure 3:
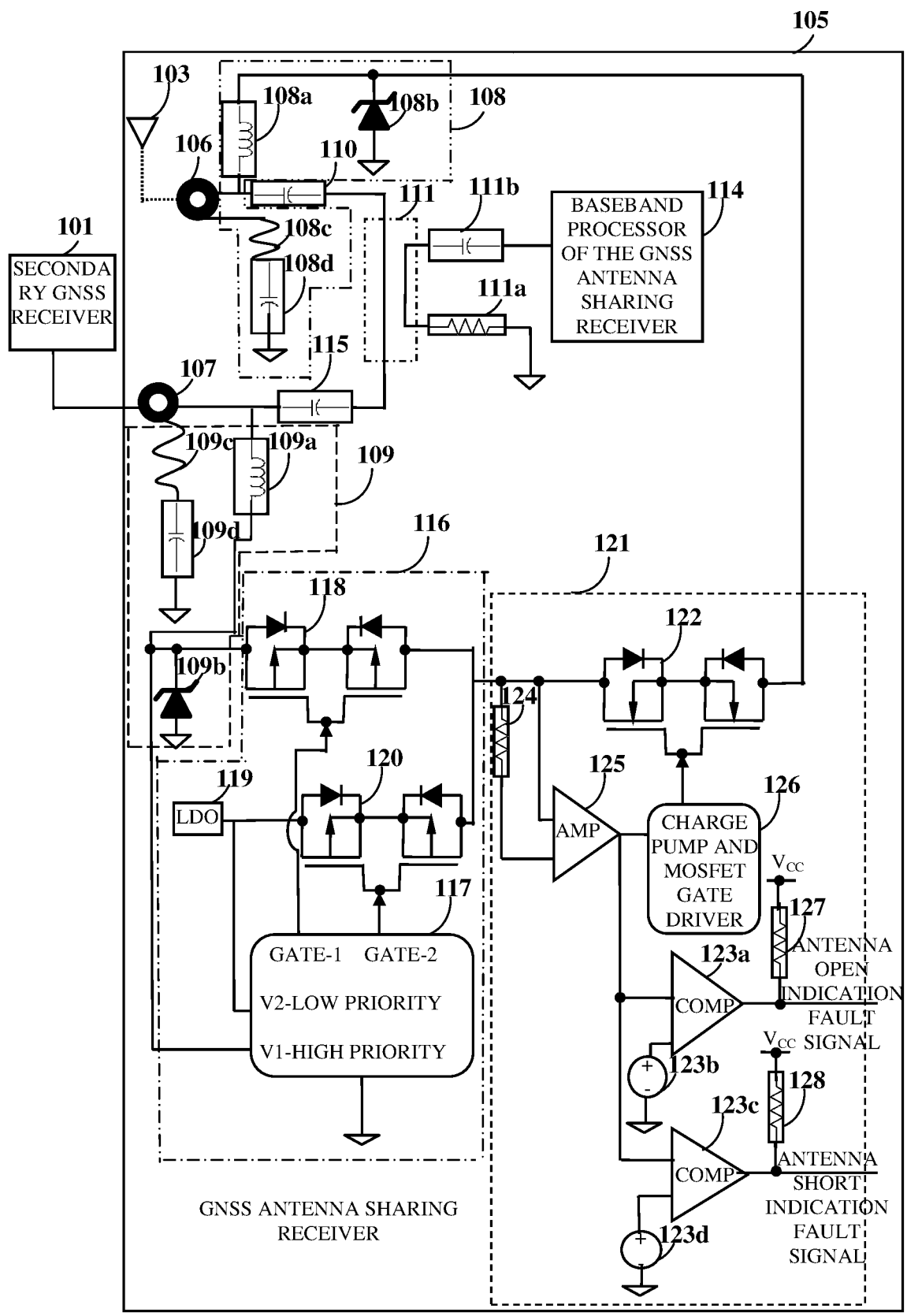
FIG. 3 exemplarily illustrates an electric circuit diagram of an implementation of the global navigation satellite system antenna sharing receiver for sharing a global navigation satellite system antenna with a secondary global navigation satellite system receiver and detecting a fault in the global navigation satellite system antenna.

FIG. 3 exemplarily illustrates an electric circuit diagram of an implementation of the global navigation satellite system (GNSS) antenna sharing receiver 105 for sharing a GNSS antenna 103 with a secondary GNSS receiver 101 and detecting a fault in the GNSS antenna 103. The GNSS antenna sharing receiver 105 comprises the input radio frequency (RF) port 106 operably connected to the GNSS antenna 103 for receiving a GNSS signal and an output RF port 107 operably connected to the input RF port 102 of the secondary GNSS receiver 101 as exemplarily illustrated in FIG. 1 and as disclosed in the detail description of FIG. 1. The input RF port 106 of the GNSS antenna sharing receiver 105 is connected via the direct current (DC) block 110 to the coupler 111. The DC block 110 is a DC blocking capacitor, herein referenced by the numeral 110, that allows the received GNSS signal to pass further into the GNSS antenna sharing receiver 105 and to the secondary GNSS receiver 101 while blocking a DC interference that damages the GNSS antenna sharing receiver 105 and the secondary GNSS receiver 101. The DC blocking capacitor 110 captures the flow of low level DCs in the received GNSS signal to pass the received GNSS signal further into the GNSS antenna sharing receiver 105 and the secondary GNSS receiver 101.

The coupler 111 is a directional coupler with four ports as disclosed in the detailed description of FIG. 2. A termination resistor 111a, connected to the isolated port of the coupler 111, prevents the second portion of the received global navigation satellite system (GNSS) signal from reflecting back from a cable (not shown) that connects the coupler 111 to the baseband processor 114 of the GNSS antenna sharing receiver 105. The resistance value of the termination resistor 111a matches with alternating current (AC) impedance of the cable that connects the coupler 111 to the baseband processor 114 of the GNSS antenna sharing receiver 105 to minimize signal reflection and power losses in the cable. The other direct current (DC) block 115 is also a DC blocking capacitor, herein referenced by the numeral 115, connected between the coupler 111 and the output RF port 107 of the GNSS antenna sharing receiver 105. The DC blocking capacitor 115 prevents any DC voltage to be transmitted further to the secondary GNSS receiver 101 from the GNSS antenna sharing receiver 105. The coupler 111 is connected to the DC blocking capacitor 115 via a 50 ohm RF trace in a micro strip implementation. A capacitor 111b acts as a DC blocking capacitor for preventing DC voltage leakage from the baseband processor 114 into the RF front end section of the GNSS antenna sharing receiver 105.

The power supply circuit 116 in the global navigation satellite system (GNSS) antenna sharing receiver 105 supplies direct current (DC) voltage to the GNSS antenna 103. The switch A 118 and the switch B 120 of the power supply circuit 116 are p channel metal-oxide semiconductor field-effect transistors (pMOSFETs) whose gate signals are driven by the switch selector 117. The switch selector 117 is a priority power path controller that selectively activates the switch A 118 and the switch B 120 to supply the DC voltage V1 or the DC voltage V2 respectively, to the GNSS antenna 103 based on availability of the secondary GNSS receiver 101. The switch selector 117 gives high priority to the DC voltage V1 supplied by the secondary GNSS receiver 101 to power the GNSS antenna 103 and increases gate voltage at Gate-1 of the pMOSFET 118 to an appropriate positive voltage level. The power supply regulator 119 in the GNSS antenna sharing receiver 105 is a low dropout regulator (LDO) and herein reference by the numeral 119. The LDO regulator 119 is a DC linear regulator that regulates output DC voltage even when the value of the DC supply voltage, for example, from batteries in the GNSS antenna sharing receiver 105 is close to the value of the output DC voltage being supplied to the GNSS antenna 103. The switch selector 117 gives low priority to the DC voltage V2 supplied by the LDO regulator 119 to power the GNSS antenna 103 and increases gate voltage at Gate-2 of the pMOSFET 120 to an appropriate positive voltage level, when the secondary GNSS receiver 101 is unavailable.

The direct current (DC) voltage V1 or the DC voltage V2 is fed to the global navigation satellite system (GNSS) antenna 103 via the current monitoring circuit 121. The current monitoring circuit 121 comprises the load switch 122, a current sense resistor 124, a current sense amplifier 125, an open circuit comparator 123a, a short circuit comparator 123c, and pull-up resistors 127 and 128. The current sense resistor 124 converts the direct current flowing to the GNSS antenna 103 from the power supply circuit 116 into a voltage that is amplified by the current sense amplifier 125 and monitored by the open circuit comparator 123a and the short circuit comparator 123c. The load switch 122 is an n channel metal-oxide semiconductor field-effect transistor (nMOSFET), herein referenced by the numeral 122, whose gate is driven by a charge pump and MOSFET gate driver 126. The output of the current sense amplifier 125 is fed to the charge pump and MOSFET gate driver 126. Based on the output from the current sense amplifier 125, the charge pump and MOSFET gate driver 126 activates or deactivates the nMOSFET 122. When the amount of direct current flowing to the GNSS antenna 103 from the power supply circuit 116 is optimal, the charge pump and MOSFET gate driver 126 activates the nMOSFET 122, reducing ON resistance of the nMOSFET 122 to a substantially low level. When the amount of direct current flowing to the GNSS antenna 103 from the power supply circuit 116 is high due to a short condition of the GNSS antenna 103 or low due to an open condition of the GNSS antenna 103, the charge pump and MOSFET gate driver 126 regulates gate voltage of the nMOSFET 122 to limit the direct current to the optimal value. The open circuit comparator 123a and the short circuit comparator 123c compare the DC voltage from the power supply circuit 116 with an open circuit voltage reference source 123b and a short circuit voltage reference source 123d respectively, to generate a fault signal. The fault signal generated by the open circuit comparator 123a using the pull-up resistor 127 and a positive reference voltage $V_{CC}$ indicates an open condition of the GNSS antenna 103 to the GNSS antenna sharing receiver 105 and the secondary GNSS receiver 101. The fault signal generated by the short circuit comparator 123c using the pull-up resistor 128 and a positive reference voltage $V_{CC}$ indicates an overload condition or short circuit condition of the GNSS antenna 103 to the GNSS antenna sharing receiver 105 and the secondary GNSS receiver 101. The loss in DC voltage while supplying power to the GNSS antenna 103 from the secondary GNSS receiver 101 is minimized by using the load switch 122, that is, the nMOSFET, in series with the ON resistance of the pMOSFET 118 or 120. The DC voltage drop across the pMOSFET 118 or 120 and the nMOSFET 122 is, for example, less than 0.35 V.

The surge protection circuits 108 and 109 positioned at the input radio frequency (RF) port 106 and the output RF port 107 of the global navigation satellite system (GNSS) antenna sharing receiver 105 comprise a combination of inductors 108a and 109a, transient voltage suppression (TVS) diodes 108b and 109b, λ/4 length RF traces 108c and 109c at a GNSS frequency, and capacitors 108d and 109d respectively. The inductors 108a and 109a of the surge protection circuits 108 and 109 respectively, offer protection to the GNSS antenna sharing receiver 105 from voltage transients of low frequency. The capacitors 108d and 109d of the surge protection circuits 108 and 109 respectively, offer protection to the GNSS antenna sharing receiver 105 from voltage transients of high frequency. The input RF port 106 of the GNSS antenna sharing receiver 105 is connected to the capacitor 108d via the λ/4 length RF trace 108c. The output RF port 107 of the GNSS antenna sharing receiver 105 is connected to the capacitor 109d via the λ/4 length RF trace 109c. The TVS diodes 108b and 109b of the surge protection circuits 108 and 109 respectively, are solid state p-n junction devices that divert or shunt voltage spikes from electrostatic discharges to protect the GNSS antenna sharing receiver 105. Under normal operating conditions of the GNSS antenna sharing receiver 105, the TVS diodes 108b and 109b present high impedance to the GNSS antenna sharing receiver 105 and the TVS diodes 108b and 109b appear as an open circuit. When the operating voltage of the GNSS antenna sharing receiver 105 is exceeded due to lightning induced transients, the TVS diodes 108b and 109b avalanche providing a low impedance path for the transient current. The transient current is diverted away from the GNSS antenna sharing receiver 105 and shunted through the TVS diodes 108b and 109b. The TVS diodes 108b and 109b return to a high impedance state after the transient threat passes.

In the electric circuit diagram exemplarily illustrated in FIG. 3, the loss of radio frequency (RF) power in transmitting the received global navigation satellite system (GNSS) signal to the output RF port 107 of the GNSS antenna sharing receiver 105 from the input RF port 106 of the GNSS antenna sharing receiver 105 is estimated as follows: Insertion loss due to the coupler 111 is, for example, about 0.5 dB. RF power loss due to the surge protection circuits 108 and 109 at the input RF port 106 and the output RF port 107 respectively, is, for example, about 0.3 dB. RF power loss due to discrete elements, for example, the direct current (DC) blocking capacitors 110, 111b, and 115, connectors of the input RF port 106 and the output RF port 107, the RF trace between the coupler 111 and the DC blocking capacitors 110 and 115, etc., between the input RF port 106 and the output RF port 107 of the GNSS antenna sharing receiver 105 is, for example, about 0.2 dB. Hence, the total loss of RF power of the received GNSS signal between the input RF port 106 and the output RF port 107 of the GNSS antenna sharing receiver 105 is, for example, about 1 dB.

Loss of radio frequency (RF) power in transmitting the received global navigation satellite system (GNSS) signal between the input RF port 106 of the GNSS antenna sharing receiver 105 and the coupled port of the coupler 111 is estimated as follows: Coupling loss due to the coupler 111 is, for example, about 5.5 dB. RF power loss due to the surge protection circuit 108 at the input RF port 106 is, for example, about 0.3 dB. RF power loss due to discrete elements, for example, the direct current (DC) blocking capacitor 110, the connector of the input RF port 106, the RF trace between the coupler 111 and the DC blocking capacitors 110 and 115, etc., between the input RF port 106 of the GNSS antenna sharing receiver 105 and the coupled port of the coupler 111 is, for example, about 0.2 dB. Hence, the total loss of RF power of the received GNSS signal between the input RF port 106 and the coupled port of the coupler 111 of the GNSS antenna sharing receiver 105 is, for example, about 6 dB. Loss of the RF power between the input RF port 106 and the coupled port of the coupler 111 of the GNSS antenna sharing receiver 105 is compensated by improving noise figure of the second portion of the received GNSS signal using the low noise amplifier 113 at the coupled port. The low noise amplifier 113 is provided in addition to the existing low noise amplifier with the GNSS antenna 103.

Attenuation in the direct current (DC) voltage V1 supplied by the secondary GNSS receiver 101 to the GNSS antenna 103 via the GNSS antenna sharing receiver 105 between the output radio frequency (RF) port 107 and the input RF port 106 of the GNSS antenna sharing receiver 105 is estimated as follows: DC voltage loss in the inductor 109a is, for example, about 0.002V and DC voltage loss in the pMOSFET 118 is, for example, about 0.1 V. The nMOSFET 122 further attenuates the DC voltage, for example, by about 0.25 V. Hence, the total attenuation in the DC voltage V1 is, for example, about 0.352 V.

Figure 4:
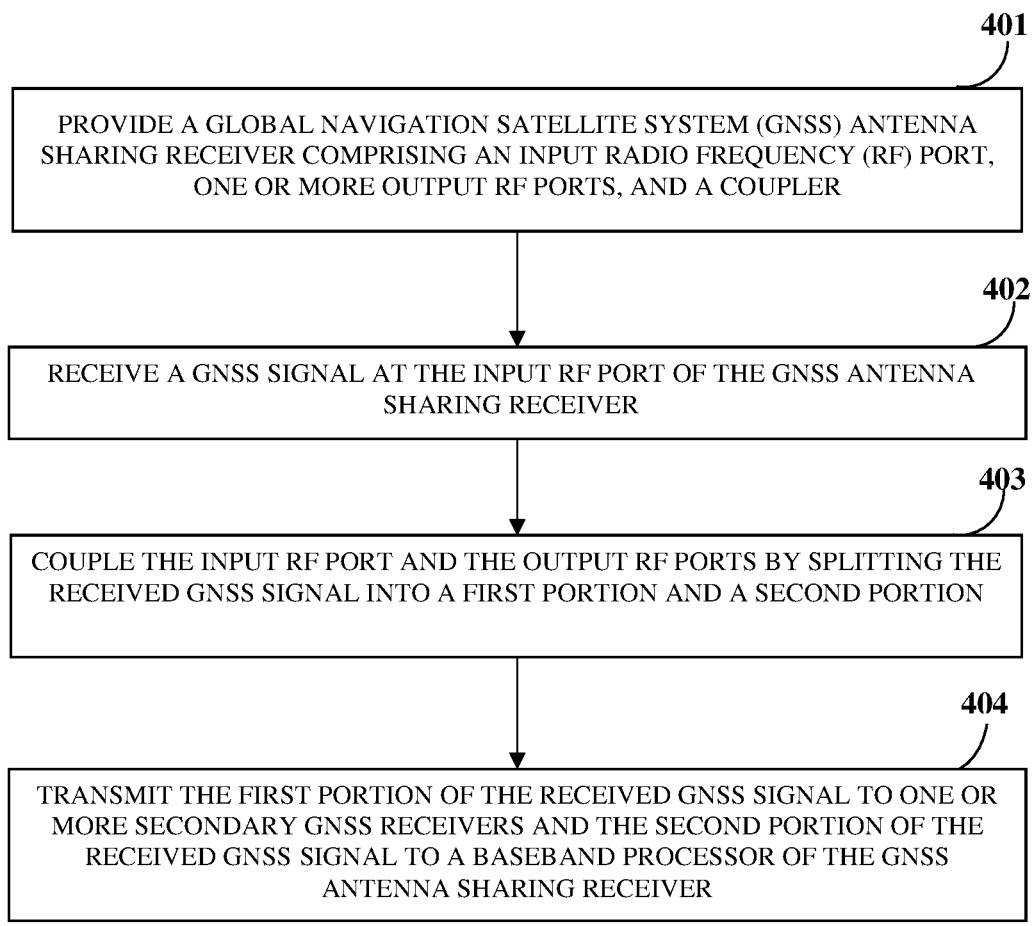
FIG. 4 illustrates a method for sharing a global navigation satellite system antenna among multiple global navigation satellite system receivers.

FIG. 4 illustrates a method for sharing a global navigation satellite system (GNSS) antenna 103 among multiple GNSS receivers, for example, the GNSS antenna sharing receiver 105 and the secondary GNSS receiver 101 exemplarily illustrated in FIG. 1. In the method disclosed herein, the GNSS antenna sharing receiver 105 comprising the input radio frequency (RF) port 106 operably connected to the GNSS antenna 103, one or more output RF ports, for example, the output RF port 107 operably connected to input RF ports of the secondary GNSS receivers, for example, the input RF port 102 of the secondary GNSS receiver 101, and the coupler 111 exemplarily illustrated in FIGS. 1-3 and as disclosed in the detailed description of FIGS. 1-3, is provided 401. The input RF port 106 of the GNSS antenna sharing receiver 105 receives 402 a GNSS signal transmitted by a GNSS satellite to the GNSS antenna 103. The coupler 111 couples 403 the input RF port 106 and the output RF port 107 of the GNSS antenna sharing receiver 105 by splitting the received GNSS signal into a first portion and a second portion. The coupler 111 transmits 404 the first portion of the received GNSS signal to the secondary GNSS receiver 101 via the output RF port 107 and the second portion of the received GNSS signal to the baseband processor 114 of the GNSS antenna sharing receiver 105. Attenuation in the first portion of the received GNSS signal transmitted to the secondary GNSS receiver 101 is substantially less as disclosed in the detail description of FIGS. 2-3. The low noise amplifier 113 in the GNSS antenna sharing receiver 105 exemplarily illustrated in FIG. 2, amplifies the second portion of the received GNSS signal prior to transmitting the second portion of the received GNSS signal to the baseband processor 114 of the GNSS antenna sharing receiver 105.

The global navigation satellite system (GNSS) antenna sharing receiver 105 further comprises the power supply circuit 116 comprising the switch A 118, the switch B 120, and the switch selector 117 exemplarily illustrated in FIG. 2, for supplying power to the GNSS antenna 103 from the GNSS antenna sharing receiver 105 and the secondary GNSS receiver 101 as disclosed in the detailed description of FIG. 2. The secondary GNSS receiver 101 supplies a direct current voltage V1 to the GNSS antenna 103. The switch selector 117 of the power supply circuit 116 activates the switch A 118 and deactivates the switch B 120 to supply the direct current voltage V1 to the GNSS antenna 103, if one of the secondary GNSS receivers, for example, the secondary GNSS receiver 101 is available. If any of the secondary GNSS receivers, for example, the secondary GNSS receiver 101 is not available, the power supply regulator 119 supplies a direct current voltage V2 to the GNSS antenna 103. The switch selector 117 deactivates the switch A 118 and activates the switch B 120 to supply the direct current voltage V2 to the GNSS antenna 103. The loss in the direct current voltage V1 supplied to the GNSS antenna 103 from one of the secondary GNSS receivers, for example, the secondary GNSS receiver 101 is substantially less.

The global navigation satellite system (GNSS) antenna sharing receiver 105 further monitors flow of direct current to the global navigation satellite system (GNSS) antenna 103 from the power supply circuit 116 using the load switch 122 of the current monitoring circuit 121 exemplarily illustrated in FIGS. 2-3 and as disclosed in the detailed description of FIGS. 2-3. The voltage comparators 123 in the current monitoring circuit 121 of the GNSS antenna sharing receiver 105 exemplarily illustrated in FIGS. 2-3, generate a fault signal indicating an overload condition or an open condition of the GNSS antenna 103 to the GNSS antenna sharing receiver 105 and the secondary GNSS receiver 101 on an increase or a decrease in the flow of direct current to the GNSS antenna 103, monitored by the load switch 122 as disclosed in the detailed description of FIG. 2.

The method and the global navigation satellite system (GNSS) antenna sharing receiver 105 disclosed herein provide an improvement in the field of GNSS communications as follows: The sharing of the GNSS antenna 103 by the GNSS antenna sharing receiver 105 and one or more secondary GNSS receivers, for example, the secondary GNSS receiver 101 simplifies installation of the GNSS receivers on a vehicle, for example, an aircraft, when an installation of the GNSS antenna 103 already exists. The method disclosed herein eliminates the need for multiple antennas and does not require adding a new antenna and cable assembly to the communication system 100 exemplarily illustrated in FIG. 1. The method disclosed herein allows an additional secondary GNSS receiver 101 to be added to the existing setup of the GNSS antenna 103 with minimal impact to the GNSS antenna sharing receiver 105, which significantly reduces the additional weight and cost to the assembly. The installation of multiple GNSS receivers is optimized as no new setup for the GNSS antenna 103 is required. The additional secondary GNSS receiver 101 can use the existing setup of the GNSS antenna 103 without disturbing a signal gain of the setup of the GNSS antenna 103 and the GNSS antenna sharing receiver 105. The method disclosed herein also eliminates the need to drill holes on the vehicle surface, for example, on aircraft fuselage to install additional GNSS antennas, and makes use of the existing setup of the GNSS antenna 103. The cost of installation of the secondary GNSS receiver 101 is reduced significantly when the GNSS antenna sharing receiver 105 and the GNSS antenna 103 is already available on a vehicle, for example, an aircraft. Structural integrity of the aircraft fuselage is also not disturbed.

The coupler 111 in the global navigation satellite system (GNSS) antenna sharing receiver 105 is a passive device that transmits the received GNSS signal to the secondary GNSS receiver 101 independent of whether the GNSS antenna sharing receiver 105 is powered on or powered off. The secondary GNSS receiver 101 functions smoothly as if the secondary GNSS receiver 101 is directly connected to the GNSS antenna 103. The coupler 111 installed in the GNSS antenna sharing receiver 105 does not require manual adjustments in setting up or operation for practical usage. The surge protection circuits 108 and 109 in the GNSS antenna sharing receiver 105 protect the GNSS antenna sharing receiver 105 and the secondary GNSS receiver 101 from lightning induced transients. Moreover, the power supply regulator 119 in the GNSS antenna sharing receiver 105 ensures an uninterrupted power supply to the GNSS antenna 103 even when the secondary GNSS receiver 101 is switched off. The power is supplied to the GNSS antenna 103 from the secondary GNSS receiver 101 even if the GNSS antenna sharing receiver 105 is switched on or switched off and even though the secondary GNSS receiver 101 is not connected to the GNSS antenna 103 directly. The low noise amplifier 113 compensates an additional signal loss due the coupler 111 without impacting the noise figure of the secondary GNSS receiver 101. The current monitoring circuit 121 of the GNSS antenna sharing receiver 105 generates a fault signal and notifies correct health status of the GNSS antenna 103 to the GNSS antenna sharing receiver 105 and the secondary GNSS receiver 101 when either the GNSS antenna sharing receiver 105 or the secondary GNSS receiver 101 is operational.

The foregoing examples have been provided merely for the purpose of explanation and are in no way to be construed as limiting of the method and the communication system 100 comprising the GNSS antenna sharing receiver 105 exemplarily illustrated in FIGS. 1-3, disclosed herein. While the method and the communication system 100 have been described with reference to various embodiments, it is understood that the words, which have been used herein, are words of description and illustration, rather than words of limitation. Furthermore, although the method and the communication system 100 have been described herein with reference to particular means, materials, and embodiments, the method and the communication system 100 are not intended to be limited to the particulars disclosed herein; rather, the method and the communication system 100 extend to all functionally equivalent structures, methods and uses, such as are within the scope of the appended claims. Those skilled in the art, having the benefit of the teachings of this specification, may effect numerous modifications thereto and changes may be made without departing from the scope and spirit of the method and the communication system 100 disclosed herein in their aspects.

We claim:

1. A global navigation satellite system antenna sharing receiver for sharing a global navigation satellite system antenna with one or more secondary global navigation satellite system receivers and detecting a fault in said shared global navigation satellite system antenna, said global navigation satellite system antenna sharing receiver comprising:
   an input radio frequency port operably connected to said global navigation satellite system antenna for receiving a global navigation satellite system signal;
   a coupler operably coupled between said input radio frequency port and one or more output radio frequency ports of said global navigation satellite system antenna sharing receiver for splitting said received global navigation satellite system signal into a first portion and a second portion based on a coupling ratio of said coupler, wherein said first portion of said received global navigation satellite system signal is transmitted to said one or more secondary global navigation satellite system receivers, and wherein said second portion of said received global navigation satellite system signal is transmitted to a baseband processor of said global navigation satellite system antenna sharing receiver; and said one or more output radio frequency ports operably connected to input radio frequency ports of said one or more secondary global navigation satellite system receivers for transmitting said first portion of said received global navigation satellite system signal to said one or more secondary global navigation satellite system receivers.

2. The global navigation satellite system antenna sharing receiver of claim 1, further comprising direct current blocks operably connected between said input radio frequency port of said global navigation satellite system antenna sharing receiver and said coupler and between said coupler and said one or more output radio frequency ports of said global navigation satellite system antenna sharing receiver for precluding direct current voltages in said received global navigation satellite system signal from entering said global navigation satellite system antenna sharing receiver and said one or more secondary global navigation satellite system receivers.

3. The global navigation satellite system antenna sharing receiver of claim 1, further comprising a low noise amplifier operably connected between said coupler and said baseband processor of said global navigation satellite system antenna sharing receiver for amplifying said second portion of said received global navigation satellite system signal prior to transmitting said second portion of said received global navigation satellite system signal to said baseband processor of said global navigation satellite system antenna sharing receiver.

4. The global navigation satellite system antenna sharing receiver of claim 3, further comprising a limiter operably connected between said coupler and said low noise amplifier for limiting said second portion of said received global navigation satellite system signal prior to transmitting said second portion of said received global navigation satellite system signal to said baseband processor of said global navigation satellite system antenna sharing receiver.

5. The global navigation satellite system antenna sharing receiver of claim 1, further comprising a surge protection circuit positioned at each of said input radio frequency port and said one or more output radio frequency ports of said global navigation satellite system antenna sharing receiver for protecting said global navigation satellite system antenna sharing receiver and said one or more secondary global navigation satellite system receivers from lightning induced transients.

6. The global navigation satellite system antenna sharing receiver of claim 1, wherein said coupler reduces attenuation in said first portion of said received global navigation satellite system signal transmitted to said one or more secondary global navigation satellite system receivers.

7. The global navigation satellite system antenna sharing receiver of claim 1, wherein said global navigation satellite system antenna is one of an active internal antenna and an active external antenna.

8. The system of claim 1, further comprising:
a power supply circuit operably connected between said input radio frequency port and said one or more output radio frequency ports of said global navigation satellite system antenna sharing receiver for supplying power to said global navigation satellite system antenna, said power supply circuit comprising:
 a first switch operably connected between one of said one or more output radio frequency ports and said input radio frequency port of said global navigation satellite system antenna sharing receiver for supplying a first direct current voltage from one of said one or more secondary global navigation satellite system receivers to said global navigation satellite system antenna;
 a second switch operably connected between a power supply regulator and said input radio frequency port of said global navigation satellite system antenna sharing receiver for transmitting a second direct current voltage supplied by said power supply regulator to said global navigation satellite system antenna, when said one or more secondary global navigation satellite system receivers are not available; and
 a switch selector operably connected to said first switch and said second switch for selectively activating said first switch and said second switch to supply one of said first direct current voltage and said second direct current voltage respectively, to said global navigation satellite system antenna based on availability of said one of said one or more secondary global navigation satellite system receivers; and
a current monitoring circuit in operable communication with said power supply circuit for monitoring flow of direct current to said global navigation satellite system antenna from said power supply circuit, limiting an increase in said flow of said direct current to said global navigation satellite system antenna due to a fault in one of said global navigation satellite system antenna and a cable connecting said global navigation satellite system antenna sharing receiver to said global navigation satellite system antenna, and generating a fault signal for indicating one of an overload condition and an open condition of said global navigation satellite system antenna to said global navigation satellite system antenna sharing receiver and said one or more secondary global navigation satellite system receivers.

9. The global navigation satellite system antenna sharing receiver of claim 8, wherein said current monitoring circuit reduces loss in said first direct current voltage supplied to said global navigation satellite system antenna from said one of said one or more secondary global navigation satellite system receivers using a load switch.

10. A method for sharing a global navigation satellite system antenna among a plurality of global navigation satellite system receivers, said method comprising:
receiving a global navigation satellite system signal at a input radio frequency port of a global navigation satellite system antenna sharing receiver;
coupling said input radio frequency port and one or more output radio frequency ports by a coupler by splitting said received global navigation satellite system signal into a first portion and a second portion based on a coupling ratio of said coupler; and
transmitting said first portion of said received global navigation satellite system signal to one or more secondary global navigation satellite system receivers and said second portion of said received global navigation satellite system signal to a baseband processor of said global navigation satellite system antenna sharing receiver by said coupler.

11. The method of claim 10, further comprising supplying power to said global navigation satellite system antenna by a power supply circuit operably connected between said input radio frequency port and said one or more output radio frequency ports of said global navigation satellite system antenna sharing receiver, comprising:
supplying a first direct current voltage from one of said one or more secondary global navigation satellite system receivers to said global navigation satellite system antenna by activating a first switch and deactivating a second switch by a switch selector of said power supply circuit, when said one of said one or more secondary global navigation satellite system receivers is available, wherein said first switch is operably connected between said one of said one or more output radio frequency ports and said input radio frequency port of said global navigation satellite system antenna sharing receiver, and wherein said second switch is operably connected between a power supply regulator of said power supply circuit and said input radio frequency port of said global navigation satellite system antenna sharing receiver; and supplying a second direct current voltage to said global navigation satellite system antenna from said power supply regulator by deactivating said first switch and activating said second switch by said switch selector, when said one or more secondary global navigation satellite system receivers are not available.

12. The method of claim 11, wherein loss in said first direct current voltage supplied to said global navigation satellite system antenna from said one of said one or more secondary global navigation satellite system receivers is substantially less.

13. The method of claim 10, further comprising monitoring flow of direct current to said global navigation satellite system antenna from said power supply circuit by a load switch of a current monitoring circuit connected between said input radio frequency port and said one or more output radio frequency ports of said global navigation satellite system antenna sharing receiver.

14. The method of claim 13, further comprising limiting an increase in said flow of said direct current to said global navigation satellite system antenna due to a fault in one of said global navigation satellite system antenna and a cable connecting said global navigation satellite system antenna sharing receiver to said global navigation satellite system antenna by said load switch.

15. The method of claim 13, further comprising generating a fault signal indicating one of an overload condition and an open condition of said global navigation satellite system antenna to said global navigation satellite system antenna sharing receiver and said one or more secondary global navigation satellite system receivers by voltage comparators of said current monitoring circuit on one of an increase and a decrease in said monitored flow of said direct current to said global navigation satellite system antenna through said load switch.

16. The method of claim 10, further comprising precluding direct current voltages in said received global navigation satellite system signal from entering said global navigation satellite system antenna sharing receiver and said one or more secondary global navigation satellite system receivers by direct current blocks operably connected between said input radio frequency port of said global navigation satellite system antenna sharing receiver and said coupler and between said coupler and said one or more output radio frequency ports of said global navigation satellite system antenna sharing receiver.

17. The method of claim 10, further comprising amplifying said second portion of said received global navigation satellite system signal by a low noise amplifier operably connected between said coupler and said baseband processor of said global navigation satellite system antenna sharing receiver prior to transmitting said second portion of said received global navigation satellite system signal to said baseband processor of said global navigation satellite system antenna sharing receiver.

18. The method of claim 17, further comprising limiting said second portion of said received global navigation satellite system signal by a limiter operably connected between said coupler and said low noise amplifier of said global navigation satellite system antenna sharing receiver prior to transmitting said second portion of said received global navigation satellite system signal to said baseband processor of said global navigation satellite system antenna sharing receiver.

19. The method of claim 10, further comprising protecting said global navigation satellite system antenna sharing receiver and said one or more secondary global navigation satellite system receivers from lightning induced transients by a surge protection circuit positioned at each of said input radio frequency port and said one or more output radio frequency ports of said global navigation satellite system antenna sharing receiver.

20. The method of claim 10, wherein attenuation in said first portion of said received global navigation satellite system signal transmitted to said one or more secondary global navigation satellite system receivers is substantially less.

* * * * *